Figure 11:
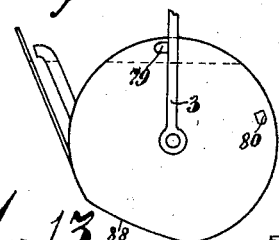
Figure 12:
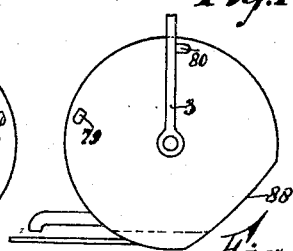
Figure 13:
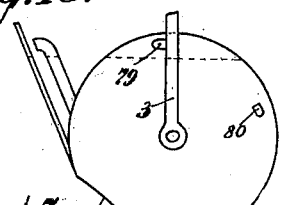
Figure 14:
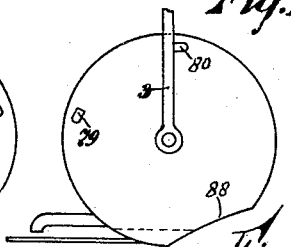

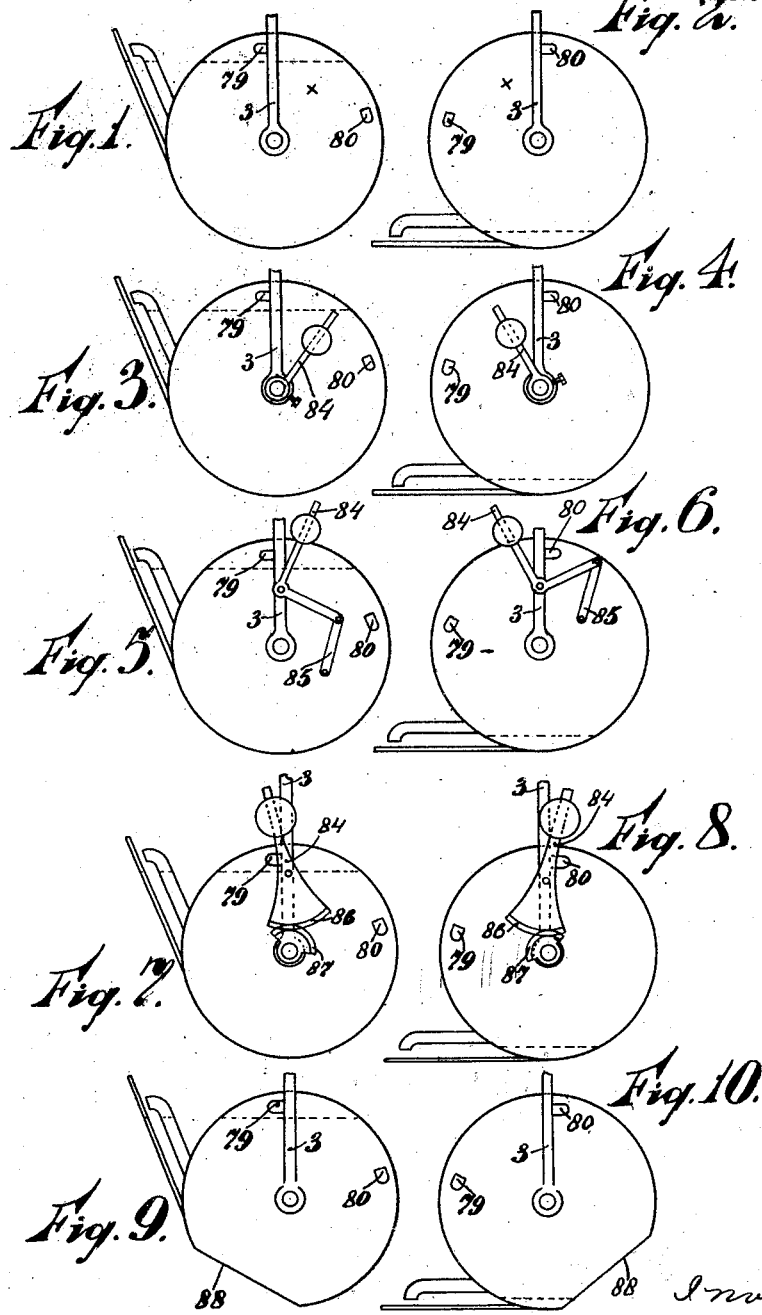

B. BOULOGNE.
WEIGHING TANK FOR AUTOMATIC WEIGHING MACHINES.
APPLICATION FILED AUG. 17, 1921.

1,426,709.

Patented Aug. 22, 1922.
12 SHEETS—SHEET 2.

Inventor
B. Boulogne,
By Marks & Clerk
Attys

B. BOULOGNE.
WEIGHING TANK FOR AUTOMATIC WEIGHING MACHINES.
APPLICATION FILED AUG. 17, 1921.
1,426,709. Patented Aug. 22, 1922.
12 SHEETS—SHEET 3.
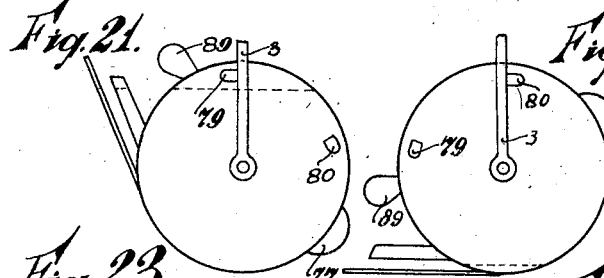
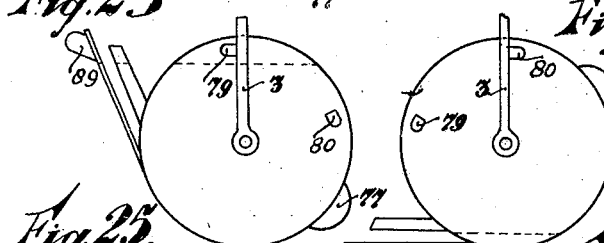
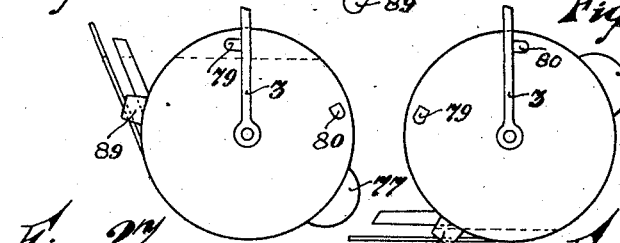
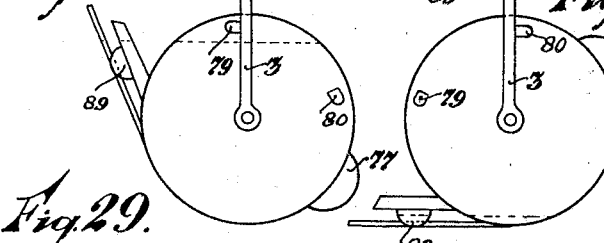
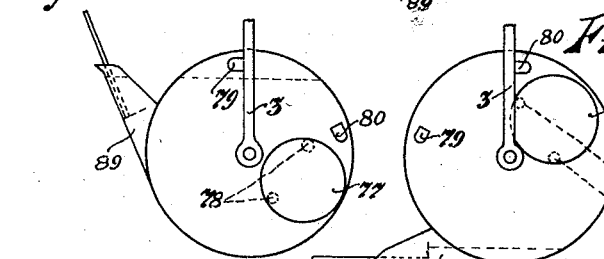
Inventor
B. Boulogne
By Marks & Clerk
attys.

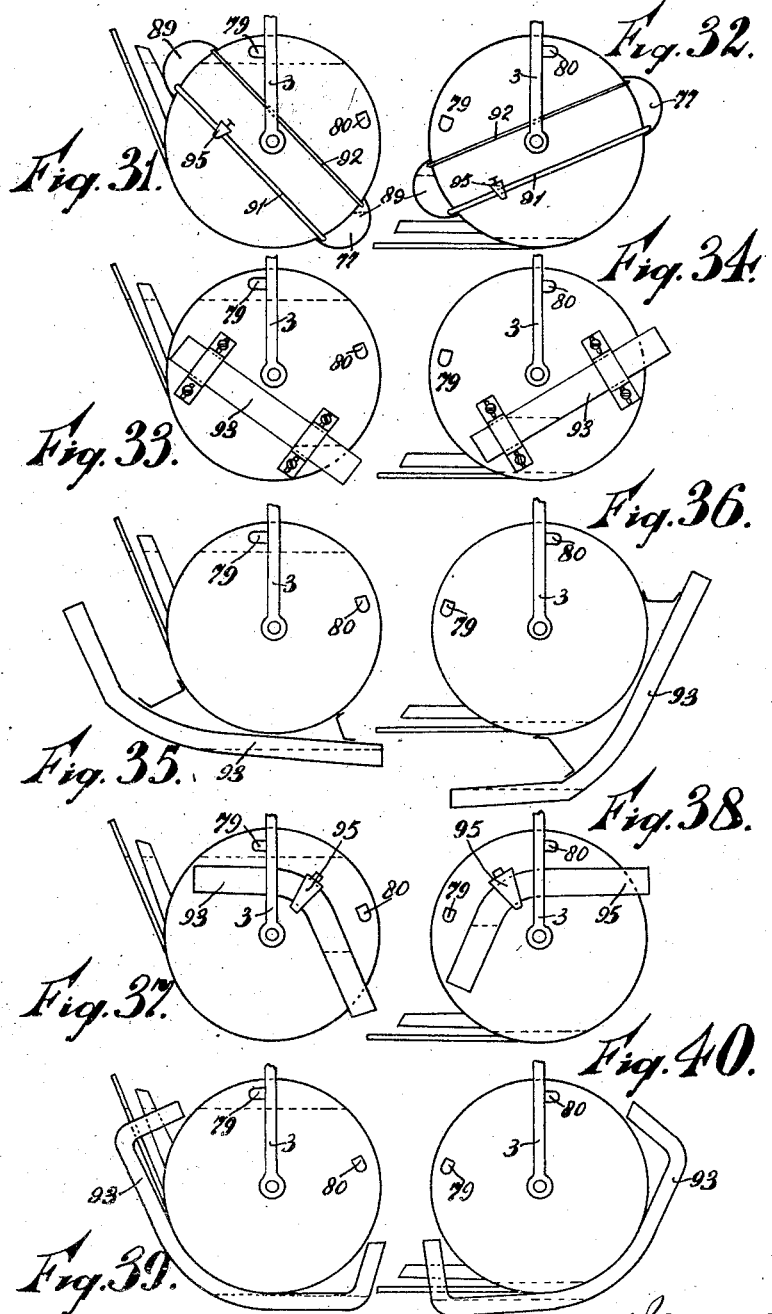

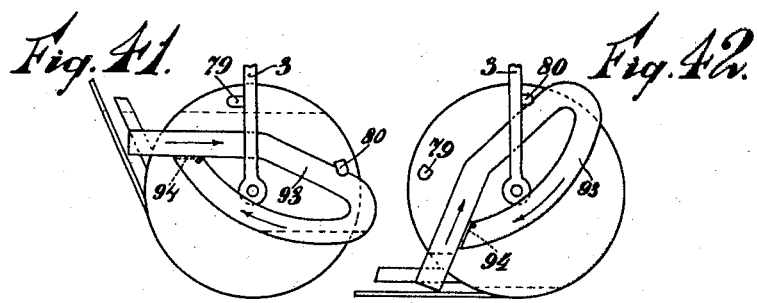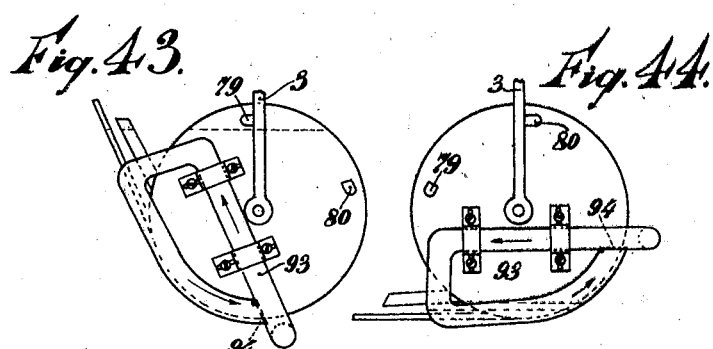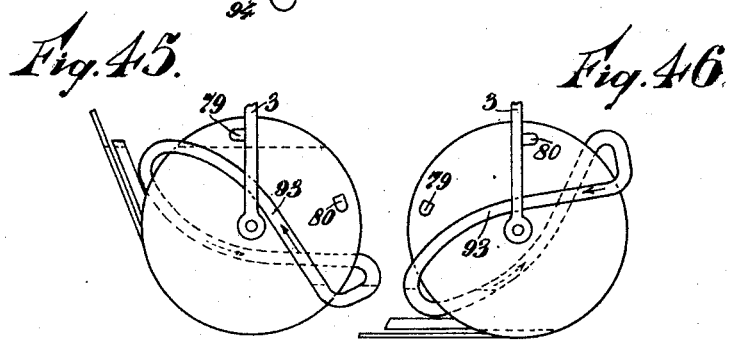

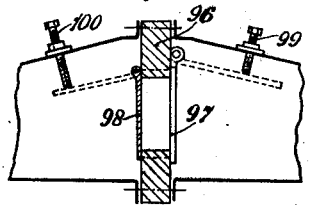
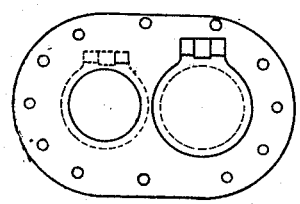
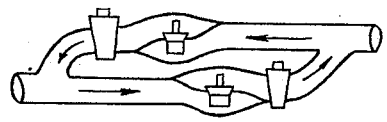
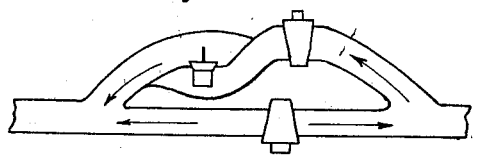

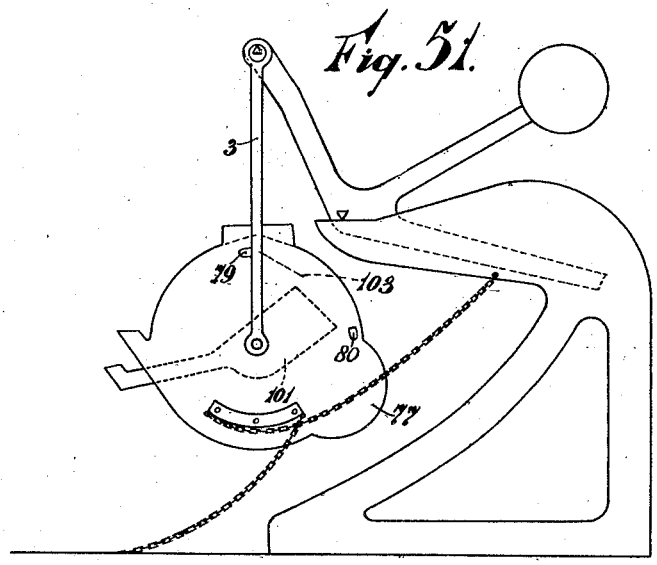
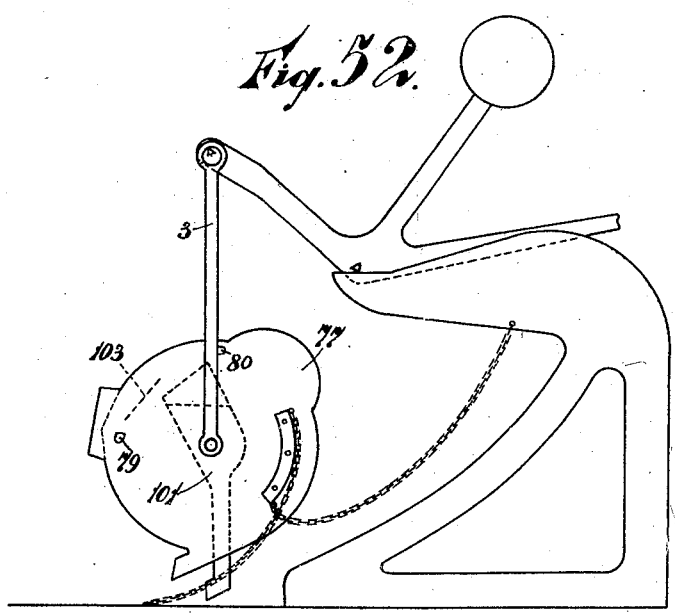

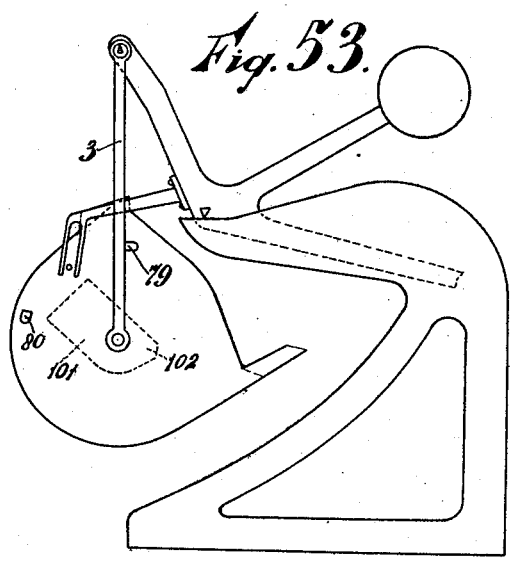
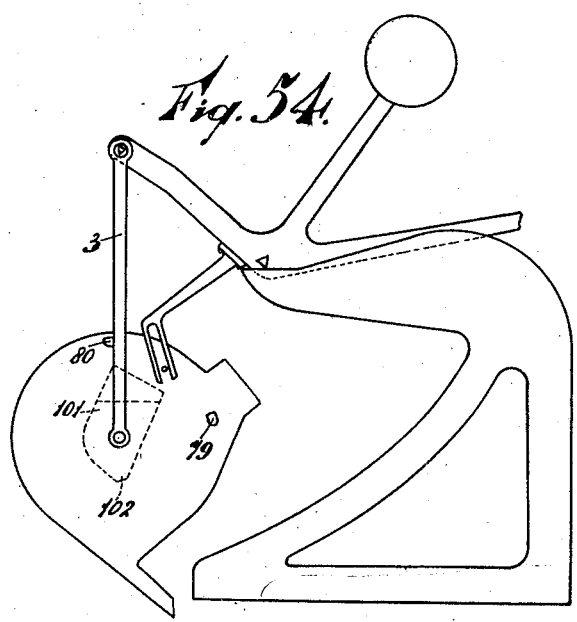

B. BOULOGNE.
WEIGHING TANK FOR AUTOMATIC WEIGHING MACHINES.
APPLICATION FILED AUG. 17, 1921.

1,426,709.

Patented Aug. 22, 1922.

12 SHEETS—SHEET 9.

Inventor
B. Boulogne
By Marks & Clerk
Attys.

B. BOULOGNE.
WEIGHING TANK FOR AUTOMATIC WEIGHING MACHINES.
APPLICATION FILED AUG. 17, 1921.

1,426,709.

Patented Aug. 22, 1922.
12 SHEETS—SHEET 10.

Fig. 57.

Inventor
B. Boulogne
By Marks & Clerk
Attys.

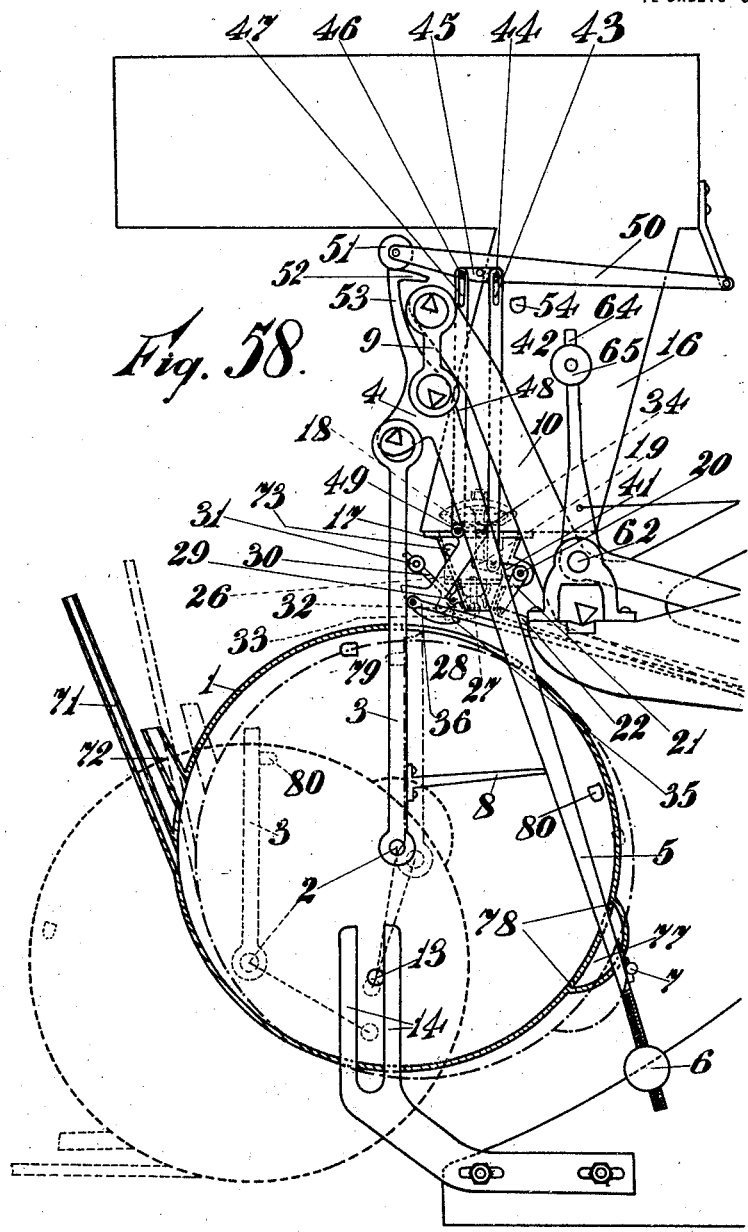

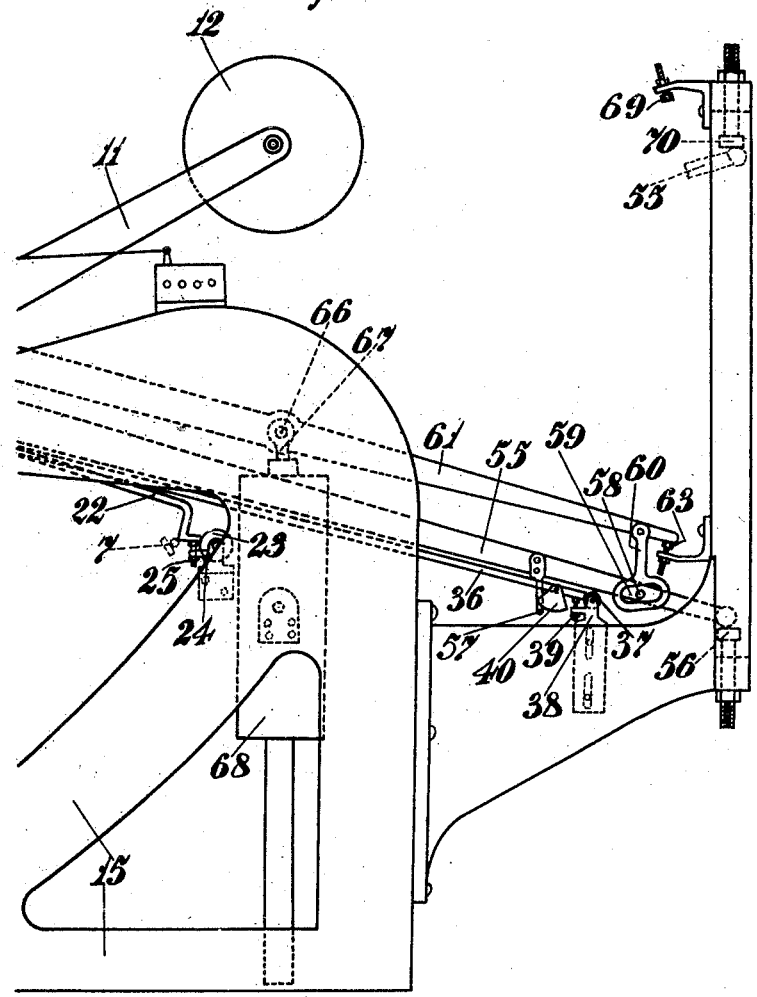

UNITED STATES PATENT OFFICE.

BALTUS BOULOGNE, OF SOERABAIA, JAVA, DUTCH EAST INDIES.

WEIGHING TANK FOR AUTOMATIC WEIGHING MACHINES.

1,426,709.  Specification of Letters Patent.  Patented Aug. 22, 1922.

Application filed August 17, 1921. Serial No. 493,057.

*To all whom it may concern:*

Be it known that I, BALTUS BOULOGNE, mechanical engineer, subject of the Queen of the Netherlands, residing at Soerabaia, Java, Dutch East Indies, have invented certain new and useful Improvements in Weighing Tanks for Automatic Weighing Machines (for which I have applied for a patent in the Netherlands January 22, 1920), of which the following is a specification.

The invention relates to a weighing tank for automatic weighing machines with tare weighing adapted for the weighing of liquid or granular matter and intended to be emptied by means of a tilting motion over a horizontal axis and after this operation be returned to the original position.

The meaning of weighing machines for the weighing of tare is, that said weighing machines are such that the charge of the receptacle is more than the quantity to be delivered at each weighing, the surplus being retained in the receptacle after each delivery, so that if the receptacle increases in weight through adhering matter or in some other manner, the value of this increase will be compensated for, by an equal weight of matter. In this way any accidental or regular change in the gross weight will not influence the net weight.

The invention intends to prevent the members causing the tilting of the weighing tank from exerting any bad influence upon the sensibility of the weighing machine, such being of paramount importance when having to do with weighing machines adapted for tare-weighing because each delivery of one charge requires two weighing operations.

According to the invention only the first part of the tilting motion in both directions is under the control of the movement of the weighing beam because if this beam changes its position from one extreme to the other, it will be guided in such a manner that it tilts over towards the position for emptying or back again towards that for charging, whilst the weighing tank after this prescribed movement will turn a little bit further of itself, which rotation is utilized to disengage the members which formerly were active in causing the tilting motion.

This further rotation is effectuated on account of the peculiar position of the centre of gravity of the tank, being shifted over from one side of the axis of rotation to the other, either during the time of being filled or being emptied after the above mentioned prescribed rotation.

The above mentioned centre of gravity may be the centre of gravity of the tank itself or that of its contents, that of some mass, the movement of which is intimately connected with that of the tank, or it may be the resultant of all these different joint factors.

By allowing ample play between the members that cause the first rotation of the weighing tank it is possible to have the further movement of the tank shift those members in such a manner in respect to each other that each time at the beginning of the tilting of the weighing beam the tank will be quite free.

Figure 56:
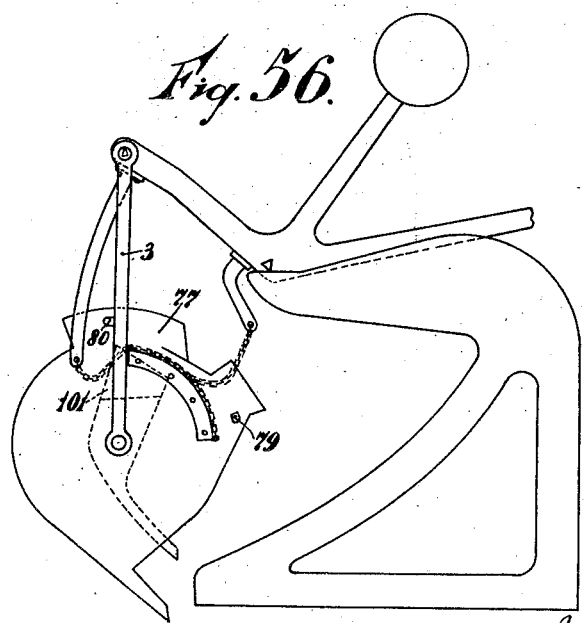

In the accompanying drawings Figs. 1–56 are diagrammatical sketches of different forms of the weighing tank, according to the invention. The Figs. 57, 58 and 59 show a side-view of a complete weighing machine in section.

For the sake of clearness we shall first explain the invention with the aid of Figs. 57, 58 and 59, this being a more complicated form of the weighing tank according to the invention.

In Figs. 57 and 58, 1 represents the weighing receptacle rotatably supported by the shaft 2. This tank or receptacle is suspended by bars 3 from the short arm 4 of an auxiliar beam, the other arm 5 of which is provided with a running weight 6 and a finger 7. This arm 5 is resting (as drawn) against a stud 8 fixed to the bar 3. The auxiliar weighing beam is suspended by means of bars 9 from one arm of the bell-crank weighing beam 10, the other arm 11 of which carries a weight 12.

The tank is provided with one or more studs 79—80, which limit the extreme positions of the tank for charging and pouring because they then engage the suspension bar 3.

The tank is provided with one or more pins 13 (or similar means) each guided in guides 14 fixed somehow and somewhere at the bottom part of the framework.

The weighing tank 1 is, at one side, provided with a spout 72 and another spout or tube 71 of greater length whilst at the opposite part it has a pocket 77.

At or near the spouts some additional weight has been fixed so as to tend to have the tank, when being empty, turn left-handed.

Said pocket 77 communicates with the tank proper by means of openings 78 provided in the wall of the tank.

The run-out 16 of the receptacle for the matter to be weighed, meets a funnel 17 and is separated therefrom, by means of a large valve 18. A bar 19 is linked to the stem of the valve 18 and is fixed to a shaft 20, the other end of which projects through the wall of the funnel and bears another bar 21 to which is linked another rod 22, the other end of which rests against a roller 23 when the valve is in the "open" position (as drawn) and which is rotatably mounted in a chair 24 which chair is provided with a screw 25 serving as a rest for the rod 22.

Independent of the funnel 17 and joining the runout 16 and situated next to the funnel 17, is a valve chamber 26 provided with a small valve 27. This small valve 27 rests upon the terminal 28 of a toggle lever having its fulcrum at 29, the other arm 30 bearing a counter weight 31. This weight 31 tends to keep the valve closed, but as shown in the drawing, is prevented from actually doing so because a finger 32 of the lever 28, 30 is resting against the pin 33 of a leakage vat 35 which is linked to the funnel 17.

This vat will, of itself, turn underneath the outlet of the funnel and of the valve-chamber 26, but will be kept aside by means of a rod 36 linked to it, which rod is resting against a roller 37, mounted upon a fixed chair 38.

The rod 36 is resting on a set screw 39 and is furthermore provided with a rotatable sector 40. A third lever 41, rotatably fixed on the shaft 20 bears a rod 42, the other end of which has a slot 43, engaging a pin, belonging to one arm of a lever 45, the other end of which has a pin 46, engaging the slot 47 of a second rod 48, linked with its free end to a point 49 moved aside. The balance beam 45 is rotatably fixed to a point of the lever 50, linked to a projecting point of the delivery tank and at its other end resting with a roller 51 upon the nose 52 of an arm 53 belonging to the secondary beam 4, 5. Underneath the lever 50 a cam 54 fixed to the outlet of the tank, limits the lower position of said lever 50.

The weighing beam proper or bellcrank 10, 11 has a tail 55, the end of which is resting upon an adjustable stop 56 in the shown position (charging position).

To this tail a finger 57 is attached, the end of which engages a sector 40, said tail, moreover, carrying a pin 58 making a loose fit with the slot 59 of an eyebar 60. This eyebar is suspended from a bellcrank lever 61 having its fulcrum at the point 62.

The terminal of this arm of the lever 61 is resting, as is shown in the drawing, near the eyebar 60, upon an adjustable stop 63, whilst the other arm 64 of said bellcrank lever carries a weight 65. At the point 66 the arm 61 of the bellcrank lever is linked to the piston rod 67 of a double buffer device 68.

Adjustable stops 69 and 70 limit the extreme positions, respectively of the bellcrank lever and the tail 55.

The operation of the weighing is as follows:

Suppose the apparatus to be in the starting position as shown in the drawing. The valves 18 and 27 are open, the liquid runs into the weighing tank 1.

As the level of the liquid in the tank 1 rises and the pocket 77 is filling the tank will turn clockwise until it reaches the extreme position for charging, this being determined by a cam 79 coming to rest against the bar 3.

If the pocket 77 is situated at such a place that the line joining the centre of gravity of the filled pocket and the centre of gravity of the weight of the spouts runs underneath the axis of rotation of the weighing tank it will of itself turn further on to the extreme position and do so slowly. The openings 78 control the speed of filling of the pocket.

The position of pin 13 and its guide 14 is such that said pin will not engage any of the sides of the guide if cam 79 will be resting against bar 3 and the charged weighing tank will be in its lower position on account of the action of the intermediate or auxiliary beam 4, 5.

This position of the weighing tank is shown in the drawing in 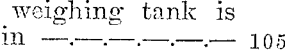 line.

The charging opening of the tank is so large that it will remain accessible during the turning of the weighing tank whilst it is being filled, remaining underneath the outlets of the charging funnel 17 and the valve-chamber 26.

Conforming to the increase of the charge of the weighing tank the auxiliary beam 4, 5 will change its position.

This will result in a withdrawal of the nose 52 of the arm 53 from under the roller 51, causing the lever 50 to come to rest upon the cam 54, thereby bringing the pins 44 and 46 of the lever 45 to a lower position, moving down in their respective slots 43—47.

The valves 18 and 27 thus remain in the "open" position. At the moment that the auxiliary beam has moved so far, that the finger 7 has reached the position indicated in the drawing in dotted lines, it will, on further displacement, lift the bar 22 over the roller 23.

The large valve 18, kept "open" by said bar and the cranks 21 and 19 fixed to the shaft 20, will now meet its seat through its own weight.

The further filling of the tank is effectuated through the small valve 27.

As soon as the tank is filled so far that it becomes heavier than the weight 12 of the weighing beam, this latter will at once tumble over to the left.

The tail 55 of the weighing beam will, at the moment of said tumbling over, move upwards and will carry along with it the rod 36 by means of the finger 57, engaging with the sector 40, said rod 36 was keeping the spillage vat aside but is now allowed to slide over the roller 37, thereby bringing said vat just underneath the funnel.

At the beginning of the shifting of the leakage vat, the pin 33, attached hereto, will set at liberty the finger of the lever 28, 30, which was keeping the small valve in the "open" position so that, now, said valve will be closed by the weight 31, the leakage vat being underneath.

If the tail 55 moves upwards from its rest 56, the pin 58 fixed to the tail will engage with the upper part of the slot 59 and carry along with it the arm 61 of the toggle device, which was resting beforehand upon the set screw 63.

The buffer 68, joined to the arm 61 by means of a link joint, governs the speed of the motion of said arm and consequently also of the weighing beam 10, 11, until the tail 55 will touch the stop 70 when in its other extreme position (the pouring position of the tank).

After this, the arm 61 will move towards and up to the stop 69, being activated by the weight 65 attached to the other end of the arm 64, of the toggle device, thus causing the release of the pin 58 in the slot 59.

If the bellcrank weighing beam 10, 11 turns from the loading position into the pouring position, the weighing tank 1 will get a tilting motion caused by the pins 13 and the guides 14.

This turning or tilting motion of the weighing tank does not require much power because the rising of the level of the liquid to the spout 72 and the tube 71 diminishes the tendency of the tank to turn clockwise under the influence of the filled pocket 77 and at the moment of tilting of the weighing beam it is only just big enough to prevent an unintentional tilting of the tank.

The tank performing only the first part of its rotation under the influence of the guides will return of itself to its extreme emptying position because the running out of liquid from the pocket through the openings 78 will give excess of weight to the spouts over the empty pocket.

In this position, the cam 80, secured to the tank will be resting against the bar 3, consequently, as is shown in the drawing in dotted lines, the pin 13 will be free again from the sides of the guide 14.

As said, the momentum of the empty spout and tube in reference to the trunnion 2 is larger than that of the empty pocket, consequently the tank will never turn back unintentionally. If the tank be tilted the liquid flows out and as soon as the level will be under the spout 72 said flow will continue only from out the long tube 71.

As soon as so much of the liquid has run out that the momentum of the weighing tank with the remainder of its contents in reference to the fulcrum of the weighing beam 10—11 will be somewhat smaller than that of the balance weight 12, said weighing beam 10—11 will again tilt over to the right.

The buffer 68 being double acting controls the tilting over of the bellcrank lever in the same manner whether it be for the emptying or for the filling position.

The weighing tank is brought home again by means of the pins 13 running between the guides 14.

During the emptying of the weighing tank and before the tilting of the weighing beam, the auxiliary beam 4, 5 has returned in its original position and will be resting against the arm 8, thereby having its arm 53 in the higher position. If the secondary weighing beam turns to the right, the nose 52 of the arm 53 will lift the roller 51, thus moving the lever 50 upwards, causing the bar 48 to shift the leakage vat 35 from under the valves 18 and 27.

The pin 33 attached to the leakage vat 35 will touch the finger 32 of the lever 28, 30 as soon as said vat be wholly removed from the valve, thus causing said lever to turn and the small valve 27 to open.

The large valve 18 being so much heavier, requires a greater force for its lifting than will do for the shifting of the leakage vat, consequently it will not move until the leakage vat will rest against its stop 73 after which the lever 45 will pull the bar 42 and by so doing will move the lever 41 causing the arm 19 to lift the valve 18.

The bars 22 and 36 have now been brought home by the lever 21 and the leakage vat respectively, and are resting against their respective rollers 23 and 37; the machine has returned to the position for being filled.

Different examples of embodiments of the tank will be described as illustrated.

In the drawings, the members that determine the first part of the tilting of the weighing tank as influenced by the movement of the weighing beam, have been omitted.

These members may be built in different manners provided they disengage when the tank is turning of itself.

In the constructions according to Figs. 57, 58 and 59, only the forward motion of the weighing tank is made use of, of course one may as well utilize the up and down motion or both in combination, or the angular motion of the suspension bars in respect to the weighing beam may be used for the same purpose.

In the accompanying drawings the illustrations of the tank, when filling, have been given odd numbers and when emptying even numbers.

The levels of the contents of the tank when filled and when emptied except for the remainder, are indicated in dotted line.

In Figs. 1 and 2 the most simple form of embodiment of a weighing tank according to the invention is drawn in the two extreme positions.

In consequence of the place of the centre of gravity—indicated with a cross—the tank will, of itself, turn to its extreme position in both directions so that, when in the charging position (Fig. 1) the centre of gravity being to the right of the axis of rotation, the cam 79 will be pressed against the suspension bar 3 whilst in Fig. 2—showing the extreme position when emptying, the centre of gravity lies to the left of the axis of rotation and the cam 80 is resting against the other side of the suspension bar 3.

In Figs. 3 and 4 a weighing tank is illustrated whereby a lever 84 with a deadweight has been secured to the trunnion of the weighing tank so as to procure a turning momentum towards the extreme positions in both directions. In this case the weighing tank itself is balanced.

In Figs. 5–6 a weighing tank is shown having a bellcrank lever 84 having a deadweight, turnable round the suspension member 3, said lever being secured to the tank by a rod 85 that at the moment of tilting of the latter the deadweight will be tilted over its fulcrum thereby causing the tank to turn further.

In Figs. 7 and 8 a tank is shown whereby a straight lever 84 is provided at one end with a deadweight and rotatably mounted on the suspension member and provided at the other end with a toothed segment 86 engaging a toothed gear 87 which is secured to the pinion of the tank and effectuating a tilting of the tank as soon as said deadweight is being shifted from its one extreme position to the other.

In Figs. 9–30 a weighing tank has been drawn whereby the automatic turning, to extreme positions of the tank is effectuated by the weight of its contents. To this purpose the tank has such a shape that during the charging the centre of gravity of the contents will come in such a position in respect to the trunnions that the tank will automatically turn towards its extreme filling position whilst in the position for emptying and before the predetermined quantity has been delivered, the centre of gravity of the contents will shift to such a position that the tank will automatically turn towards its extreme pouring position.

In the embodiments according to Figs. 9–14 the above mentioned distribution of weight of the contents of the tank is realized through making the tank of cylindrical shape and provide it with a flattened bottompart to such an extent that this part 88 will shift its position from one side of the axis of rotation to the other, corresponding to the charging or the pouring position of the tank.

Figure 15:
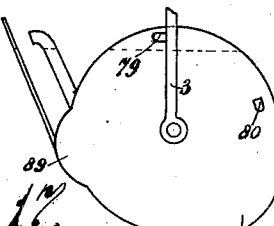
Figure 16:
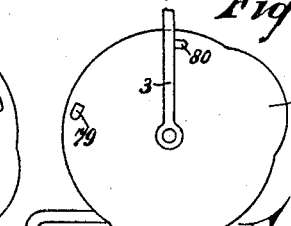
Figure 17:
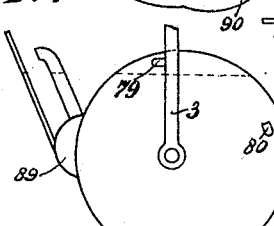
Figure 18:
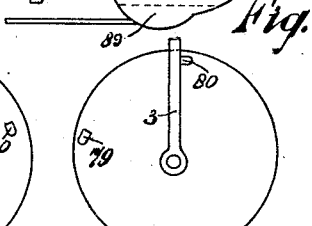

The realization of the above mentioned desideratum has been obtained according to Figs. 15–16, by means of local pockets 89—90 whilst in Figs. 17–18 the tank has been suspended eccentrically, the side of the spout being provided with a pocket 89.

Figure 19:
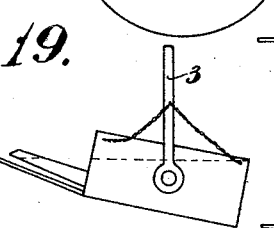
Figure 20:
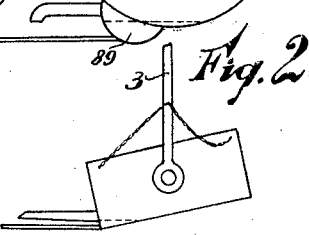

In Figs. 19–20 the tank is made rectangular and the extreme positions have been predetermined in such a manner that when in the extreme charging position the centre of gravity of the contents is situated opposite the spout whilst after the pouring the centre of gravity of the remainder (tare) is situated at the side of the spout.

In the Figs. 21–22 a pocket 77 is situated at the side opposite the spout; after the charging, part of the charge will be in this pocket, causing the centre of gravity to lie at that side of the trunnion whilst, at the side of the spout a similar pocket 89 finds place; this pocket, being above the level of the charge, remains empty but after pouring will contain all or nearly all of the remainder (tare) causing the centre of gravity to be at the side of the spout.

According to Figs. 23–24 said pocket 89 may as well be positioned at one of the spouts instead of at the tank itself.

In the embodiments according to Figs. 25–26–27–28 the pocket 89, positioned at the spout lies below the level of the liquid in the charged tank and in this case the opposite pocket 77 should be larger or further away from the axis of rotation because in the filling position when both pockets are filled the latest mentioned pocket must have overweight.

In Figs. 29–30 the pocket 89 near the spouts, has been realized by a partition 90 arranged in the wide spout, this partition is about vertical in the pouring position of the tank and closes the spout up to a certain height so that the partition forms a space at the inner side of the tank which cannot be emptied the tank being in the emptying position and hence fulfills the role of the pocket.

In the partition 90 is an aperture, provided with a tube if so desired, allowing of a slow flow of the very last part of the quantity to be delivered. The pocket 77 of the opposite side of the spouts has been provided at one of the sides of the tank, differing in this respect from the other arrangements.

In the Figs. 31–32 the tank has been provided with two pockets 89, 77, these however do not communicate with the inside of the tank but communicate with each other by means of a tube 91, so that, every time the tank is tilted, the contents of the space formed by the pockets and the connecting tube whether it be a liquid or a granular material, will collect at the lowest point thus causing the well known operation of automatic turning over.

The upper parts of the pockets are united by an air tube 92 which may be omitted in case some granular matter be used in the pockets.

In Figs. 33–46 some other examples of a weighing tank are given, where the pockets and tubes just described have been replaced by a hollow member 93 serving the purpose of playing the part of the described pockets. The level of the material which is contained by said hollow member is indicated in dotted line.

In the Figs. 33 and 34 this member 93 is a straight tube closed at the ends and adjustably secured to the tank.

In the Figs. 35–36 said tube has been given a bent form and of such special shape that upon turning the tank from the filling position to the pouring position, just after the beginning of this change contents of said tube will move towards the other side of the vertical of the turning axis and so will assist the turning motion of the tank and cause to reach the extreme position automatically.

Weighing tanks for the weighing of wheat and such like require some more care for the tilting than those intended for the use for liquids and in that case it may be of advantage for the quick working to support or to check the motion of the tank in certain positions.

In Figs. 37–38 the tube 93 has been given such a shape that its contents will check the rotation of the tank in both directions during the first and larger part of the movement counteracting the oscillatory movement of the weighing tank.

In order to assist the weighing tank in its compelled tilting movement towards one or the other position or to check this, said tube 91 uniting the two pockets Figs. 31–32 may be curved.

In Figs. 39 and 40 an embodiment is given where the tuberous member is not closed at the ends but shaped in such a manner that the running out of its contents cannot find place in the extreme positions.

In case, for the assistance or checking of the compelled rotatory motion of the weighing tank, it be desirable to have a tube bent upwards whilst for the same purpose but for the other direction of motion said tube should be bent downwards, the tube may conveniently be made in the shape of a loop provided with a return valve so as to prevent that its contents might run to and fro in the lowest part.

In Figs. 41, 42, 43, 44 two realizations of the idea have been shown, the flow is indicated by arrows and the valves bear the numeral 94.

One may also apply a closed tube—Figs. 45–46 bent in the particular manner shown as a spherical sinusoid—in this case no return valves are wanted.

This tube may go round the tank or be secured to the sides. Instead of using a hollow member partially filled with a liquid or some granular material one may also use guide bars between which a weight may be displaced or one may take a tube having a ball inside. If this ball has a diameter only somewhat smaller than the bore of the tube, the air in the tube will serve the purpose of cushioning the displacement by cataract action.

By making the tube non-uniform in bore the speed of displacement of the ball may be controlled at will. If so desired one may provide the tube with air openings, eventually of adjustable passage.

When using two communicating pockets the uniting tube may be provided with a cock 95 or some similar device (Figs. 31–32) so as to enable the operator to control the speed of flow.

When using hollow members one may also make use of one or more controlling devices 95 (Figs. 37–38). A quiet action may easily be obtained by securing the hollow member 93 to the tank in some adjustable manner.

In case different speeds of flow are desired for both directions one may use a different controlling device for each direction—if so desired—provided with return valves.

The Figs. 47–48 show, by way of example, the construction of such valves, in longitudinal and in cross-section.

To this purpose a partition 96 is provided having openings for both directions of flow and both having a return valve 97—98. Adjustable stops 99 and 100 control the lift of the valves. These valves may be given any shape and be placed anywhere whilst the speed of flow may be controlled by any suitable means, Figs. 49 and 50 give examples of this.

Both pockets and their communication means (Figs. 31–32) and also the hollow member (Figs. 33–46) may, if such be desired be fixed in a rotatable manner to the suspension bars instead of rigidly to the tank itself and be connected to the tank in such a manner that they will partake in the rotation of the tank in the same manner as e. g. the weight in the type of Figs. 5–8. In the same manner a guideway with a running weight or a tube with a ball within may me applied.

In Figs. 51–56 weighing tanks are shown in the extreme positions and intended more especially for the weighing of granular or pulverent matter showing at the same time part of the machine and the device for the compelled turning motion of the weighing tank.

When weighing granular matter the remainder of the weighing will not move as easily as a liquid, upon the return of the tank from its emptying towards its charging position but will have considerable friction. Now in order to require as little power as is possible for the return to the charging position of the tank, it is advisable to keep the remainder as close as can be to the axis of rotation.

To this purpose, according to Figs. 51–52 the tank has been provided with another tank 101 to which the narrow spout is connected (being made so much longer inwardly for this purpose) and holding part of the charge.

When being emptied the weighing tank will soon be empty through the run of the large spout but this will not deliver all the quantity to be delivered. The narrow spout will supply the balance and after this, said auxiliary tank will retain the balance. This auxiliary tank is applied in such a manner that the centre of gravity of the remainder is about in the axis of rotation of the weighing tank so that this tare presents very little resistance to the turning back of the weighing tank.

In Figs. 53, 54, 55, 56 two other examples of realization of the idea have been given showing the auxiliary tank 101.

That of Figs. 53–54 shows an auxiliary tank without a spout but provided with a small hole 102 so that the contents of this tank will run out by means of the spout of the weighing tank.

Figure 55:
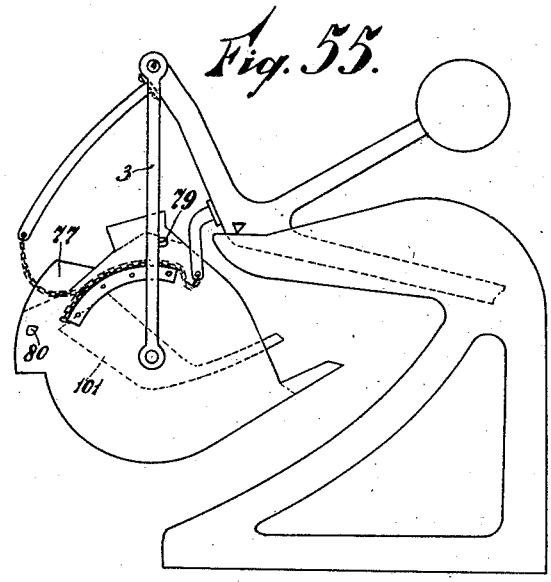

That of Figs. 55–56 shows a weighing tank with an auxiliary tank having a narrow spout placed above the wide spout.

In Figs. 51–52 the tank has been provided with a baffle plate 103 so as to split the incoming charge.

In Figs. 55–56 the pocket 77 is open at the top because granular matter has no tendency to run over the edge.

That which I claim as my invention, and desire to secure by Letters Patent, is:

1. Weighing tank for automatic weighing machines with tare-weighing, for liquid and for granular material, which weighing tank is suspended from a weighing beam and rotatable upon a horizontal axis and provided with stops or other suitable means to limit the extreme positions for charging and for pouring, in respect to the suspension members, whilst further on, means have been provided of such a nature that they compel the weighing tank to accomplish the first part of its movement under the control of the movement of the weighing beam and after this to release the weighing tank during its further turning towards the extreme positions, for which further rotation the weighing tank is made in such a manner that it will be accomplished automatically, in consequence of its search for equilibrium.

2. Weighing tank for automatic weighing machines with tare-weighing, for liquid and for granular material, which weighing tank is suspended from a weighing beam and rotatable upon a horizontal axis and provided with stops or other suitable means to limit the extreme positions for charging and for pouring in respect to the suspension members, whilst further on, means have been provided of such a nature that they compel the weighing tank to accomplish the first part of its movement under the control of the movement of the weighing beam and after this to release the weighing tank during its further turning towards the extreme positions for which further turning the weight distribution of the weighing tank has been chosen in such a manner that the centre of gravity after each compelled turning motion of the tank will be shifted over from one side of the turning axis to the other.

3. In a weighing apparatus, a tilting weighing beam, a tilting weighing tank associated with said beam, and means for compelling said tank to perform the first part of its tilting motion in both directions in consequence of the tilting of the weighing beam, said tank being capable of continuing the latter part of its tilting motion automatically as a result of its search for equilibrium, the extreme positions of said weighing tank being predetermined, and the means for compelling tilting of the tank during the first part of its movement being so constructed that it does not interfere with the proper working of the weighing beam when the tank is in its extreme positions.

4. A weighing apparatus as claimed in claim 3 in which the tank is provided at one side of its center of gravity with a pouring spout and at the other side of its center of gravity with a weighted mass.

5. A weighing apparatus as claimed in claim 3 in which the weighing tank is provided with a spout arranged at one side of its center of gravity and a pocket at the other side of its center of gravity adapted to be filled with the material to be weighed.

6. An apparatus as claimed in claim 3 in which the weighing tank is provided with a pouring spout arranged at one side of its center of gravity and pocket arranged at the other side of its center of gravity, said tank being provided with apertures to permit material from the tank to flow into and out of said pocket.

7. An apparatus as claimed in claim 3 in which the tank is suspended from the weighing beam, pivoted links, and said tank being provided with stops engageable with said links for predetermining the extreme positions of said tank.

8. An apparatus as claimed in claim 3 in which the tank is suspended from the weighing beam by means of links, stops provided on said weighing tank and cooperating with said links for determining the extreme positions of the tank, a pouring spout for the tank arranged at one side of the center of gravity of the latter, and a weighted mass arranged at the other side of the center of gravity of said tank.

9. An apparatus as claimed in claim 3 in which the means for compelling the first part of the tilted motion of said tank includes a slotted guideway and a pin slidably mounted in said guideway.

10. An apparatus as claimed in claim 3 in which the means for compelling the first part of the tilting motion of the tank includes a fixed slotted guideway, and a pin fixed to said tank and engaging the slot in said guideway.

11. An apparatus as claimed in claim 3 in which the tank is suspended from the weighing beam by means of links, stops provided on said tank and engageable with said links for determining the extreme positions of said tank, and in which the means for compelling the first part of the tilting movement of the tank includes a slotted guide member, and a pin cooperating with the same.

12. In a weighing apparatus, a tilting beam, links suspended from said beam, a tilting tank supported by said links and having a pouring spout arranged at one side of its center of gravity, means for compelling said tank to perform the first part of its tilting motion in both directions in consequence of the tilting of the weighing beam, said spout when containing the material being weighed, being adapted to cause the tank to automatically continue the latter part of its tilting motion in one direction, means for automatically causing the tank to complete the latter part of its tilting motion in the opposite direction, and means for determining the extreme positions of said tank.

In testimony whereof I affix my signature.

BALTUS BOULOGNE.